(12) United States Patent
Kwon et al.

(10) Patent No.: US 9,350,201 B2
(45) Date of Patent: May 24, 2016

(54) WIRELESS POWER TRANSMISSION DEVICE, WIRELESS POWER TRANSMISSION CONTROL DEVICE, AND WIRELESS POWER TRANSMISSION METHOD

(75) Inventors: Sang Wook Kwon, Gyeonggi-do (KR); Eun Seok Park, Suwon-si (KR); Young-tack Hong, Suwong-si (KR); Sang Wook Nam, Seoul (KR); Jong Min Park, Seoul (KR); Yoon Goo Kim, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 1099 days.

(21) Appl. No.: 12/905,905

(22) Filed: Oct. 15, 2010

(65) Prior Publication Data
US 2011/0089769 A1    Apr. 21, 2011

(30) Foreign Application Priority Data
Oct. 16, 2009    (KR) .................. 10-2009-0098779

(51) Int. Cl.
*H02J 17/00*    (2006.01)
*H04B 5/00*    (2006.01)

(52) U.S. Cl.
CPC .............. *H02J 17/00* (2013.01); *H04B 5/0037* (2013.01); *H04B 5/0093* (2013.01)

(58) Field of Classification Search
USPC ........................................ 307/104
See application file for complete search history.

(56) References Cited

U.S. PATENT DOCUMENTS

| | | |
|---|---|---|
| 6,047,214 A | 4/2000 | Mueller et al. |
| 7,076,206 B2 | 7/2006 | Elferich et al. |
| 2008/0157603 A1 | 7/2008 | Baarman et al. |
| 2008/0227478 A1* | 9/2008 | Greene et al. .................. 455/522 |
| 2008/0278264 A1 | 11/2008 | Karalis et al. |
| 2009/0079268 A1 | 3/2009 | Cook et al. |
| 2009/0160261 A1 | 6/2009 | Elo |

(Continued)

FOREIGN PATENT DOCUMENTS

| | | |
|---|---|---|
| EP | 1863190 A1 | 12/2007 |
| JP | 06-178464 | 6/1994 |

(Continued)

OTHER PUBLICATIONS

Extended European Search Report issued by the European Patent Office Apr. 9, 2015 for the corresponding European Patent Application No. 10187912.0 (16 pages).

(Continued)

*Primary Examiner* — Jared Fureman
*Assistant Examiner* — Daniel Kessie
(74) *Attorney, Agent, or Firm* — NSIP Law

(57) ABSTRACT

A wireless power transmission device, a wireless power transmission control device, and a wireless power transmission method are provided. A coupling frequency between a source resonator and a target resonator is determined. A transmission frequency is controlled such that power is transmitted from the source resonator to the target resonator at the coupling frequency. Therefore, it is possible to maintain a high power transmission efficiency without using an additional matching circuit even when a distance between the source resonator and the target resonator is changed.

15 Claims, 7 Drawing Sheets

(56) References Cited

U.S. PATENT DOCUMENTS

| | | |
|---|---|---|
| 2010/0045114 A1* | 2/2010 | Sample et al. ............... 307/104 |
| 2011/0133568 A1* | 6/2011 | Wang et al. ................. 307/104 |

FOREIGN PATENT DOCUMENTS

| | | |
|---|---|---|
| JP | 2002-354711 | 12/2002 |
| JP | 2003-284264 A | 10/2003 |
| JP | 2004-072832 | 3/2004 |
| JP | 2004-166384 | 6/2004 |
| JP | 2006-230032 | 8/2006 |
| JP | 2006-286254 A | 10/2006 |
| JP | 2007-329589 | 12/2007 |
| JP | 2008-278038 A | 11/2008 |
| KR | 10-2005-0105200 | 11/2005 |
| WO | WO 00/54387 A1 | 9/2000 |
| WO | WO 2007/129260 A2 | 11/2007 |
| WO | WO/2009/111597 A2 | 9/2009 |

OTHER PUBLICATIONS

Extended European Search Report issued on Nov. 20, 2014 in counterpart European Application No. 10187912.0 (9 pages, in English).
Korean Office Action issued on Mar. 25, 2016 in counterpart Korean Application No. 10-2009-0098779. (16 pages with English translation).

* cited by examiner

FIG. 4
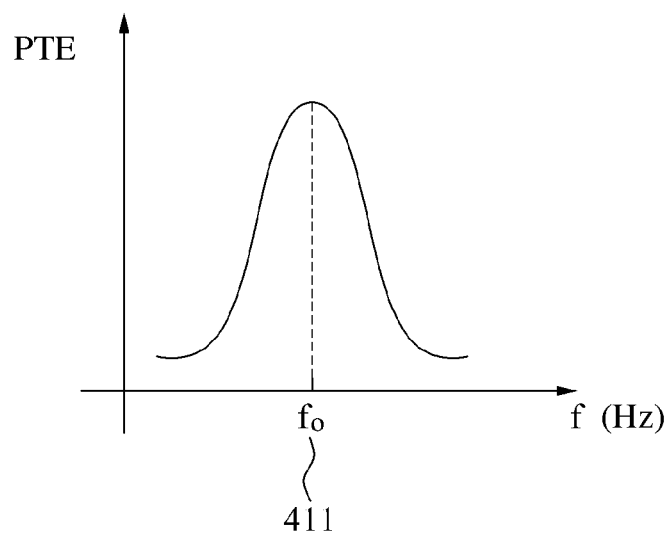
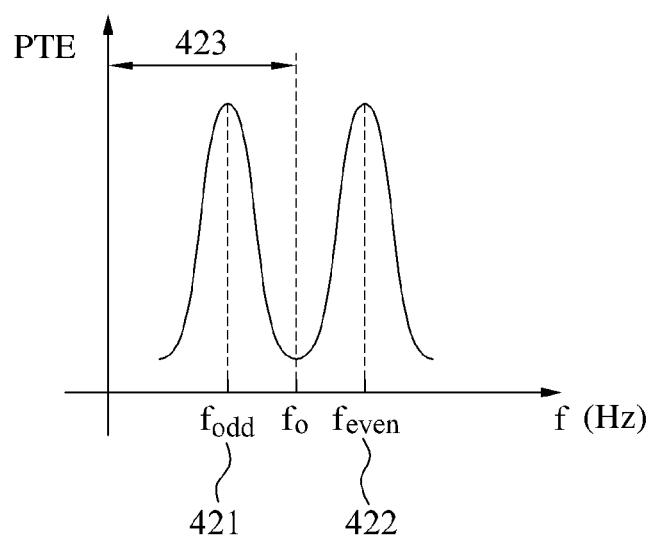

WIRELESS POWER TRANSMISSION DEVICE, WIRELESS POWER TRANSMISSION CONTROL DEVICE, AND WIRELESS POWER TRANSMISSION METHOD

CROSS-REFERENCE TO RELATED APPLICATION(S)

This application claims the benefit under 35 U.S.C. §119 (a) of Korean Patent Application No. 10-2009-0098779, filed on Oct. 16, 2009, in the Korean Intellectual Property Office, the entire disclosure of which is incorporated herein by reference for all purposes.

BACKGROUND

1. Field

The following description relates to a wireless power transmission technology, and more particularly, the following description relates to a wireless power transmission technology that generates a high power transmission efficiency even when a distance between resonators changes.

2. Description of Related Art

Recently, a variety of portable electronic products have been released as the development of information technologies (IT) has increased. Battery performance of the portable electronic products is emerging as an important issue. Portable electronic products as well as household appliances can function to wirelessly transmit data, however, conventionally they can only receive power through wired power lines.

Wireless power transmission technologies for supplying power in a wireless manner have been studied in recent years. In a wireless environment, a distance between a source resonator and a target resonator is likely to vary as time passes. Accordingly, the requirements to match the source resonator with the target resonator may also change over time. Therefore, there is a demand for a method to improve wireless power transmission efficiency and a wireless power transmission method that may adapt when the distance between the two resonators and/or the matching requirements change.

SUMMARY

In one general aspect, there is provided a wireless power transmission device, comprising a determiner to determine a coupling frequency between a source resonator and a target resonator, and a controller to control a transmission frequency such that power is transmitted from the source resonator to the target resonator at the determined coupling frequency.

The coupling frequency may be an odd mode frequency.

The determiner may measure a reflected wave received from the target resonator that is in response to a transmission signal transmitted from the source resonator to the target resonator, and determine the coupling frequency to be a frequency where the reflected wave has a minimum amplitude.

The determiner may measure a reflected wave received from the target resonator that is in response to a transmission signal transmitted from the source resonator to the target resonator, and determine the coupling frequency to be a frequency where a phase of the reflected wave is identical to a phase of the transmission signal.

The determiner may measure a reflected wave received from the target resonator that is in response to a transmission signal transmitted from the source resonator to the target resonator, and determine the coupling frequency to be a frequency where the reflected wave has a minimum power.

The determiner may comprise a power detector that detects the power of the reflected wave.

The determiner may scan a band of frequencies lower than a center frequency of the transmission signal, and measure the reflected wave generated by the scanned band of frequencies.

The wireless power transmission device may further comprise a distance measuring unit to measure a distance between the source resonator and the target resonator, wherein, when the distance between the source resonator and the target resonator decreases, the determiner may scan a band of frequencies lower than the transmission frequency and measures the reflected wave, and when the distance between the source resonator and the target resonator increases, the determiner may scan a band of frequencies higher than the transmission frequency and measures the reflected wave.

The determiner may comprise a directional coupler to measure the reflected wave.

The controller may comprise a phase locked loop (PLL) circuit to control the transmission frequency.

In another aspect, there is provided a wireless power transmission method, comprising determining a coupling frequency between a source resonator and a target resonator, and controlling a transmission frequency such that power is transmitted from the source resonator to the target resonator at the determined coupling frequency.

In another aspect, there is provided a wireless power transmission device, comprising an input unit to receive an input of a coupling frequency between a source resonator and a target resonator, and a controller to control a transmission frequency such that power is transmitted from the source resonator to the target resonator at the input coupling frequency.

In another aspect, there is provided a wireless power transmission method, comprising receiving an input of a coupling frequency between a source resonator and a target resonator, and controlling a transmission frequency such that power is transmitted from the source resonator to the target resonator at the input coupling frequency.

In another aspect, there is provided a wireless power transmission control device, comprising a determiner to determine a coupling frequency between a source resonator and a target resonator, and an output unit to transmit the coupling frequency to a wireless power transmission device.

The coupling frequency may be an odd mode frequency.

When an amount of a power transmitted by the wireless power transmission device is less than a predetermined value, the determiner may determine the coupling frequency.

The wireless power transmission control device may further comprise an input unit to receive an input of the predetermined value.

Other features and aspects may be apparent from the following description, the drawings, and the claims.

BRIEF DESCRIPTION OF THE DRAWINGS

FIG. 4 includes graphs illustrating examples of a change in a coupling frequency between a source resonator and a target resonator based on a distance between the source resonator and the target resonator.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
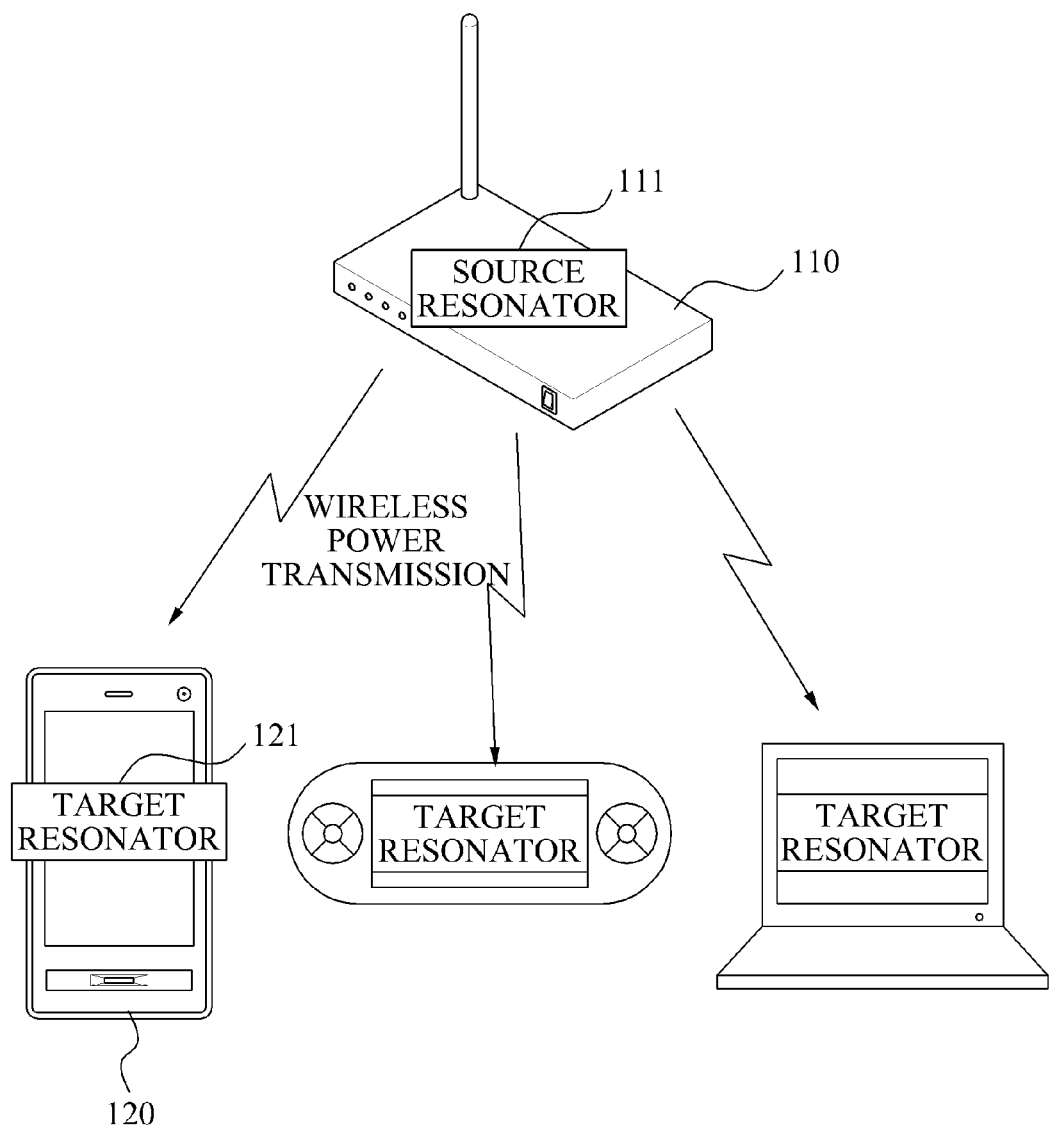
FIG. 1 is a diagram illustrating an example in which a wireless power transmission device wirelessly transmits power to one or more terminals.

FIG. 1 illustrates an example in which a wireless power transmission device wirelessly transmits a power to one or more terminals.

Referring to FIG. 1, the wireless power transmission device 110 includes a source resonator 111, and the terminal 120 includes a target resonator 121. For example, the wireless power transmission device 110 may be installed as a module into a portable terminal. As described herein, the target resonator 121 may also act as a wireless transmission device, and vice versa. The target resonator may include, for example, a mobile terminal, a laptop computer, a personal digital assistant, and the like. The source resonator may include, for example, a resonator, a mobile terminal, a laptop computer, a personal digital assistant, and the like.

Figure 2:
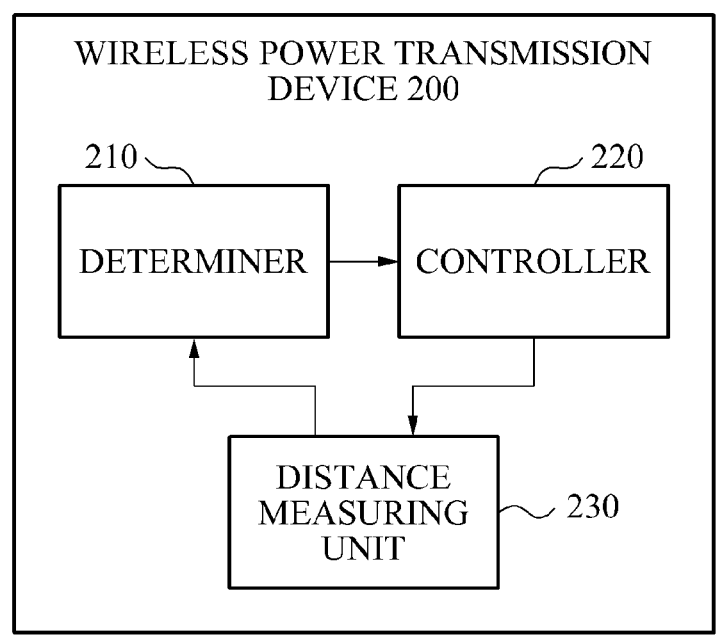
FIG. 2 is a diagram illustrating an example of a wireless power transmission device.

FIG. 2 illustrates an example of a wireless power transmission device.

Referring to FIG. 2, wireless power transmission device 200 includes a determiner 210, a controller 220, and a distance measuring unit 230.

The determiner 210 may determine a coupling frequency between a source resonator and a target resonator. For example, the coupling frequency may be an odd mode frequency which is further described with reference to FIGS. 3 and 4.

The controller 220 may control a transmission frequency so that power may be transmitted at a coupling frequency. For example, the controller 220 may include a phase locked loop (PLL) circuit, and the controller 220 may control the transmission frequency using the PLL circuit.

The wireless power transmission device may further include a distance measuring unit 230 to measure a distance between a source resonator and a target resonator, for example, the source resonator 110 and the target resonator 120, as shown in FIG. 1. For example, when the distance between the source resonator and the target resonator decreases, the determiner 210 may scan a band of frequencies lower than the transmission frequency and may measure a wave reflected from the target resonator in response to the transmitted scanned frequency bands. As another example, when the distance between the source resonator and the target resonator increases, the determiner 210 may scan a band of frequencies higher than the transmission frequency and may measure the reflected wave in response to the transmitted scanned frequency bands.

For example, the distance measuring unit may measure a distance between a source resonator and a target resonator using a distance sensor based on light, a distance sensor based on ultrasonic waves, and the like.

In some embodiments, that is, the determiner 210 may determine a coupling frequency between a source resonator and a target resonator, based on the distance measured by the distance measuring unit 230. The controller 220 controls the operation of the determiner 210 and the distance measuring unit 230.

Figure 3:
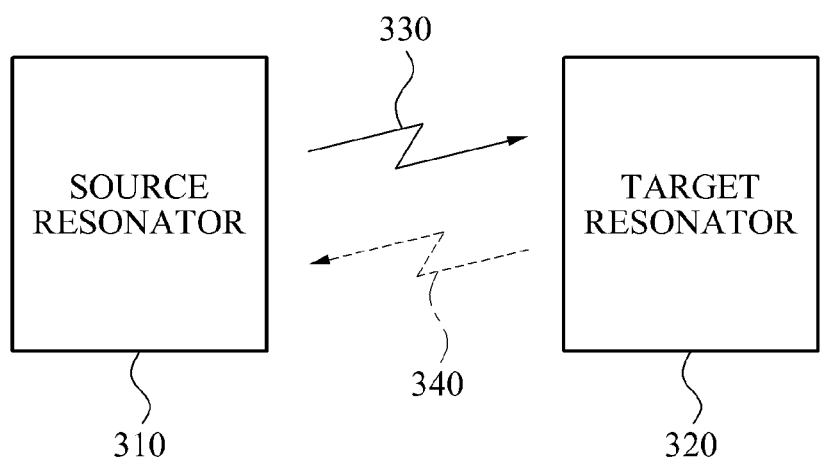
FIG. 3 is a diagram illustrating an example of a transmission signal and a reflected wave which are transmitted between a source resonator and a target resonator, respectively.

FIG. 3 illustrates an example of a transmission signal and a reflected wave which are transmitted between a source resonator and a target resonator, respectively.

Referring to FIG. 3, a source resonator 310 may transmit a transmission signal 330 to a target resonator 320 to wirelessly transmit power. In this example, a portion of the transmission signal 330 may be reflected and returned. This reflected signal is referred to as a reflected wave 340.

A determiner of a wireless power transmission device (i.e. the source resonator) may measure the reflected wave 340 of the transmission signal 330, and may determine the coupling frequency based on the measured reflected wave 340. For example, the determiner may determine the coupling frequency to be a frequency at which the reflected wave 340 has a minimum amplitude. As another example, the determiner may measure the reflected wave 340, and may determine the coupling frequency to be a frequency at which a phase of the reflected wave 340 is the same as a phase of the transmission signal 330. As another example, the determiner may measure the reflected wave 340, and may determine the coupling frequency to be a frequency at which the reflected wave 340 has a minimum power. The determiner may include a power detector, and may detect the power of the reflected wave 340 using the power detector.

Referring to FIG. 3, when the determiner scans frequency bands, the determiner transmits frequency bands, and then receives a reflected band in response. Based on this reflected band, the determiner determines whether the reflected band is, for example, at a minimum amplification, the same phase as the transmission signal, at a minimum power, and the like. That is, the scanning actually refers to the determiner transmitting various frequency bands to adjust the reflective band to become, for example, at least one of a minimum amplification, the same phase as the transmission signal, a minimum power, and the like. It is through this scanning that the determiner may test a number of frequency bands to determine, for example, which frequency band achieves a desired reflected band.

In some embodiments, the determiner may include a directional coupler, and the determiner may measure the reflected wave 340 using the directional coupler.

The determiner may scan a band of frequencies lower than a center frequency of the transmission signal 330, and may measure the reflected wave 340. Because an odd mode frequency is lower than the center frequency of the transmission signal 330, the determiner may scan the odd mode frequency and measure the reflected wave 340, in order to determine the odd mode frequency as a coupling frequency. This operation is further described with reference to FIG. 4.

The wireless power transmission device may include a distance measuring unit 230 (shown in FIG. 2) to measure a distance between the source resonator 310 and the target resonator 320. For example, when the distance between the source resonator 310 and the target resonator 320 decreases, the determiner may scan a band of frequencies lower than the transmission frequency and may measure the reflected wave 340. As another example, when the distance between the source resonator 310 and the target resonator 320 increases, the determiner may scan a band of frequencies higher than the transmission frequency and may measure the reflected wave 340. This operation is further described with reference to FIG. 4.

FIG. 4 includes graphs that illustrate examples of a change in a coupling frequency between a source resonator and a target resonator based on a distance between the source resonator and the target resonator.

Referring to FIG. 4, the coupling frequency between the source resonator and the target resonator may be changed based on the distance between the source resonator and the target resonator.

For example, the coupling frequency may be represented by the following Equation 1:

$$w = \frac{w1 + w2}{2} \pm \sqrt{\left(\frac{w1 - w2}{2}\right)^2 + k^2},$$ [Equation 1]

where w denotes a coupling frequency, w1 denotes a resonant frequency of a source resonator, w2 denotes a resonant frequency of a target resonator, and k denotes a coupling coefficient. When the source resonator is disposed at a distance relatively far from the target resonator, the coupling coefficient k may have a smaller value. When the source resonator is disposed relatively close to the target resonator, the coupling coefficient k may have a larger value.

In graph 410 of FIG. 4, when the distance between the source resonator and the target resonator is far enough away, the coupling coefficient k may have a value of '0,' and the source resonator and the target resonator may be set in advance such that they both have the same resonant frequency (namely, w1=w2). In other words, the coupling frequency w may have a single value of '$f_o$' denoting a center frequency 411. Before coupling the source resonator to the target resonator, both the source resonator and the target resonator may have the center frequency 411 as a resonant frequency.

In graph 420 of FIG. 4, when the distance between the source resonator and the target resonator is shorter, the coupling coefficient k may have values other than '0,' and the coupling frequency w may have a value of '$f_{odd}$' denoting an odd mode frequency 421 and a value of '$f_{even}$' denoting an even mode frequency 422. In this example, the odd mode frequency 421 is shown to the left of the center frequency 411, and is lower in value than the center frequency 411. In this example, the even mode frequency 422 is shown to the right of the center frequency 411 and is higher in value than the center frequency 411. For example, the determiner of the wireless power transmission device may scan a band of frequencies lower than the center frequency 411 of the transmission signal, and may measure the reflected wave of the transmission signal, to determine the odd mode frequency 421 as a coupling frequency.

Referring to Equation 1, when the source resonator is disposed close to the target resonator according to a change in a location of the terminal, a value of k may be increased and a value of the odd mode frequency 421 may be reduced, as compared with before the change in the location of the terminal. The wireless power transmission device may further include a distance measuring unit to measure the distance between the source resonator and the target resonator. When the distance between the source resonator and the target resonator is reduced, the determiner may scan a band of frequencies lower than the transmission frequency and may measure the reflected wave of the transmission signal, to determine the odd mode frequency 421 as a coupling frequency.

Additionally, in Equation 1, when the source resonator is disposed relatively far away from the target resonator according to a change in a location of the terminal, a value of k may be reduced and a value of the odd mode frequency 421 may be increased, as compared to before the change in the location of the terminal. In some embodiments, the wireless power transmission device may include a distance measuring unit to measure the distance between the source resonator and the target resonator. When the distance between the source resonator and the target resonator is increased, the determiner may scan a band of frequencies higher than the transmission frequency and may measure the reflected wave of the transmission signal, to determine the odd mode frequency 421 as a coupling frequency.

For example, the determiner of the wireless power transmission device may scan a band of frequencies lower than the center frequency 411 of the transmission signal, and may measure the reflected wave of the transmission signal. Referring to Equation 1, the odd mode frequency is lower than the center frequency 411 of the transmission signal, and the determiner may scan the odd mode frequency and may measure the reflected wave of the transmission signal, to determine the odd mode frequency 421 as a coupling frequency.

Figure 5:
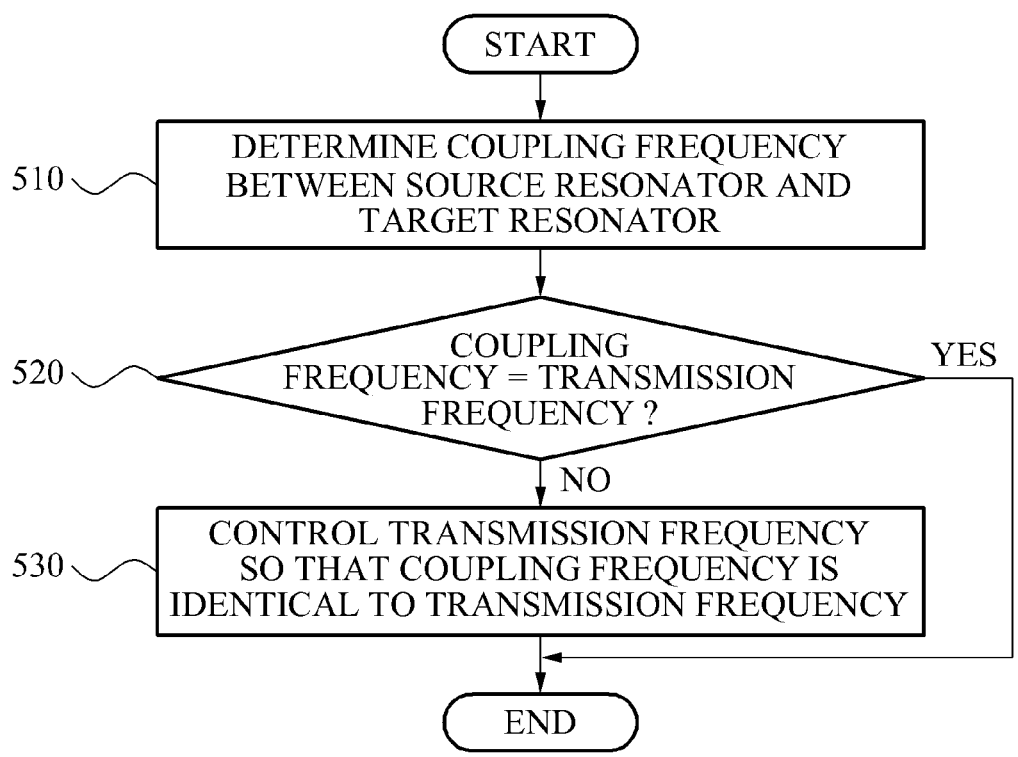
FIG. 5 is a flowchart illustrating an example of a wireless power transmission method.

FIG. 5 illustrates an example of a wireless power transmission method.

Referring to FIG. 5, a coupling frequency between a source resonator and a target resonator is determined in 510.

For example, a reflected wave of a transmission signal may be measured, and the coupling frequency may be determined based on the reflected wave, for example, the coupling frequency may be a frequency where the reflected wave has a minimum amplitude. As another example, the reflected wave may be measured, and the coupling frequency may be determined to be a frequency where a phase of the reflected wave is the same as a phase of the transmission signal. As another example, the reflected wave may be measured, and the coupling frequency may be determined to be a frequency where the reflected wave has a minimum power.

As an example, a directional coupler may be used to measure the reflected wave.

In some embodiments, a band of frequencies lower than a center frequency of the transmission signal may be scanned, and the reflected wave may be measured.

The wireless power transmission method may include measuring a distance between the source resonator and the target resonator. For example, when the distance between the source resonator and the target resonator decreases, a band of frequencies lower than a transmission frequency may be scanned and the reflected wave may be measured. When the distance between the source resonator and the target resonator increases, a band of frequencies higher than the transmission frequency may be scanned and the reflected wave may be measured. Accordingly, the transmission frequency may be adjusted in real time as the distance between the target resonator and the source resonator changes in real time.

Whether the coupling frequency is the same as the transmission frequency is determined in 520.

In this example, the transmission frequency is controlled such that power is transmitted at the coupling frequency in 530. In this example, the transmission frequency may be controlled to be equal to the coupling frequency. In some embodiments, a PLL circuit may be used to control the transmission frequency.

As another example, the wireless power transmission method may include determining an odd mode frequency as the coupling frequency between the source resonator and the target resonator, and controlling the transmission frequency such that the odd mode frequency is the same as the transmission frequency when the odd mode frequency is determined to differ from the transmission frequency.

Figure 6:
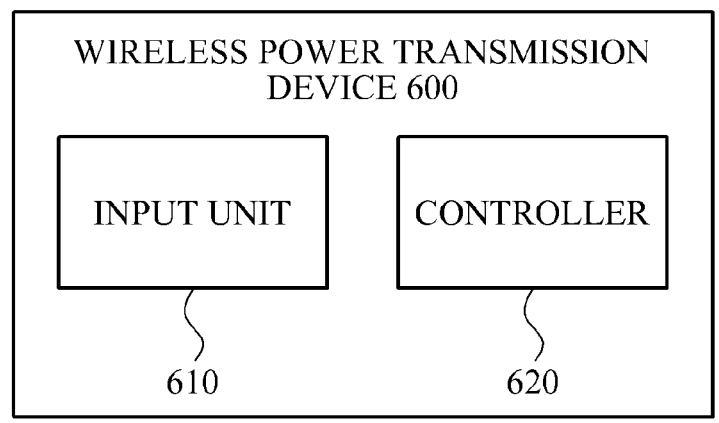
FIG. 6 is a diagram illustrating another example of a wireless power transmission device.
Figure 7:
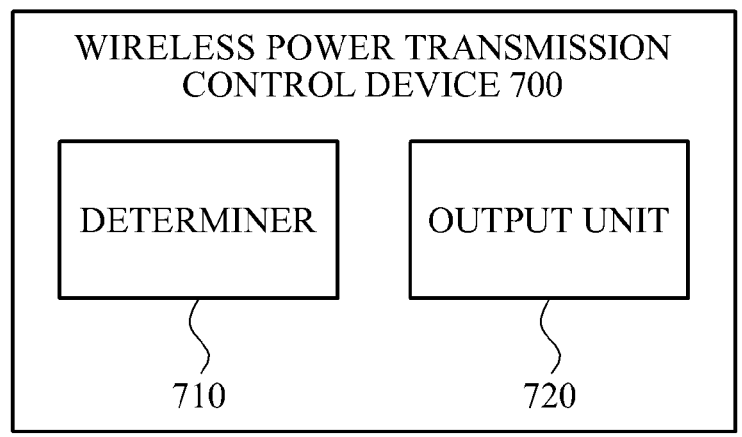
FIG. 7 is a diagram illustrating an example of a wireless power transmission control device.

FIG. 6 illustrates another example of a wireless power transmission device. FIG. 7 illustrates an example of a wireless power transmission control device.

Referring to FIG. 6, a wireless power transmission device 600 includes an input unit 610 and a controller 620. In some embodiments, the wireless power transmission device may also include a distance measuring unit (not shown).

The input unit 610 may receive an input of a coupling frequency between a source resonator and a target resonator.

For example, the input unit 610 may receive a coupling frequency from a terminal including the target resonator. The terminal may wirelessly receive power from the wireless power transmission device 600. For example, the terminal may include a wireless power transmission control device enabling measurement of the coupling frequency, as shown in FIG. 7.

Referring to FIG. 7, wireless power transmission control device 700 includes a determiner 710 and an output unit 720. In some embodiments, the wireless power transmission control device may also include a distance measuring unit (not shown).

The determiner 710 may determine a coupling frequency between a source resonator and a target resonator. As described above, for example, the coupling frequency may be an odd mode frequency. For example, when an amount of power transmitted by the wireless power transmission device is less than a predetermined value, the determiner 710 may determine the coupling frequency. The operation of the determiner 710 is described above, thus, further description thereof is omitted herein.

The output unit 720 may transmit the coupling frequency to a wireless power transmission device. The wireless power transmission device may control a transmission frequency such that power may be transmitted at the coupling frequency received from the output unit 720.

Additionally, the input unit 610 may receive a coupling frequency from an external device enabling determination of a coupling frequency between a source resonator and a target resonator. For example, the external device may include a wireless power transmission control device as described above with reference to FIG. 7.

The controller 620 may control the transmission frequency such that power may be transmitted at a coupling frequency. For example, the controller 620 may include a PLL circuit, and control the transmission frequency using the PLL circuit.

For example, the wireless power transmission device 600 may be included in a terminal, and may wirelessly transmit a power to other terminals. The wireless power transmission control device 700 may be included in a terminal.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission device, comprising:
   a determiner configured to determine a coupling frequency between a source resonator and a target resonator, based on a reflected wave received from the target resonator that is in response to a transmission signal transmitted from the source resonator to the target resonator,
   wherein the coupling frequency being an odd mode frequency, and
   wherein the odd mode frequency is less than a center frequency between the source resonator and the target resonator; and
   a controller configured to control a transmission frequency such that power is transmitted from the source resonator to the target resonator at the determined coupling frequency,
   wherein, the determiner scans a band of frequencies lower than the transmission frequency in response to the distance between the source resonator and the target resonator decreased, and the determiner scans a band of frequencies higher than the transmission frequency in response to the distance between the source resonator and the target resonator increased, for measuring the reflected wave.

2. The wireless power transmission device of claim 1, wherein the determiner measures the reflected wave, and determines the coupling frequency to be a frequency where the reflected wave has a minimum amplitude.

3. The wireless power transmission device of claim 2, wherein the determiner scans a band of frequencies lower than a center frequency of the transmission signal, and measures the reflected wave generated by the scanned band of frequencies.

4. The wireless power transmission device of claim 2, further comprising a distance measuring unit to measure a distance between the source resonator and the target resonator.

5. The wireless power transmission device of claim 4, wherein the distance measuring unit is configured to measure the distance between the source resonator and the target resonator using a distance sensor based on light.

6. The wireless power transmission device of claim 2, wherein the determiner comprises a directional coupler to measure the reflected wave.

7. The wireless power transmission device of claim 1, wherein the determiner measures the reflected wave, and determines the coupling frequency to be a frequency where a phase of the reflected wave is identical to a phase of the transmission signal.

8. The wireless power transmission device of claim 1, wherein the determiner measures the reflected wave, and determines the coupling frequency to be a frequency where the reflected wave has a minimum power.

9. The wireless power transmission device of claim 8, wherein the determiner comprises a power detector that detects the power of the reflected wave.

10. The wireless power transmission device of claim 1, wherein the controller comprises a phase locked loop (PLL) circuit to control the transmission frequency.

11. The wireless power transmission device of claim 1, wherein the determiner is configured to scan the odd mode frequency to determine that the odd mode frequency is the coupling frequency.

12. A wireless power transmission method by a processor, comprising:
  scanning a band of frequencies lower than the transmission frequency in response to the distance between the source resonator and the target resonator decreased, and a band of frequencies higher than the transmission frequency in response to the distance between the source resonator and the target resonator increased, for measuring the reflected wave;
  determining a coupling frequency between a source resonator and a target resonator, the coupling frequency being an odd mode frequency,
  wherein the odd mode frequency is less than a center frequency between the source resonator and the target resonator; and
  controlling a transmission frequency such that power is transmitted from the source resonator to the target resonator at the determined coupling frequency.

13. A wireless power transmission control device, comprising:
  a determiner configured to determine a coupling frequency between a source resonator and a target resonator, the coupling frequency being an odd mode frequency,
  wherein the odd mode frequency is less than a center frequency between the source resonator and the target resonator; and
  an output unit configured to transmit the coupling frequency to a wireless power transmission device,
  wherein, the determiner scans a band of frequencies lower than the transmission frequency in response to the distance between the source resonator and the target resonator decreased, and the determiner scans a band of frequencies higher than the transmission frequency in response to the distance between the source resonator and the target resonator increased, for measuring the reflected wave.

14. The wireless power transmission control device of claim 13, wherein, when an amount of a power transmitted by the wireless power transmission device is less than a predetermined value, the determiner determines the coupling frequency.

15. The wireless power transmission control device of claim 14, further comprising an input unit to receive an input of the predetermined value.

* * * * *